Nov. 17, 1942.  W. V. MAZE  2,302,133
MOLD FOR RETREADING AND/OR RECAPPING TIRES
Filed Feb. 26, 1941  5 Sheets-Sheet 1

Inventor
W. V. Maze

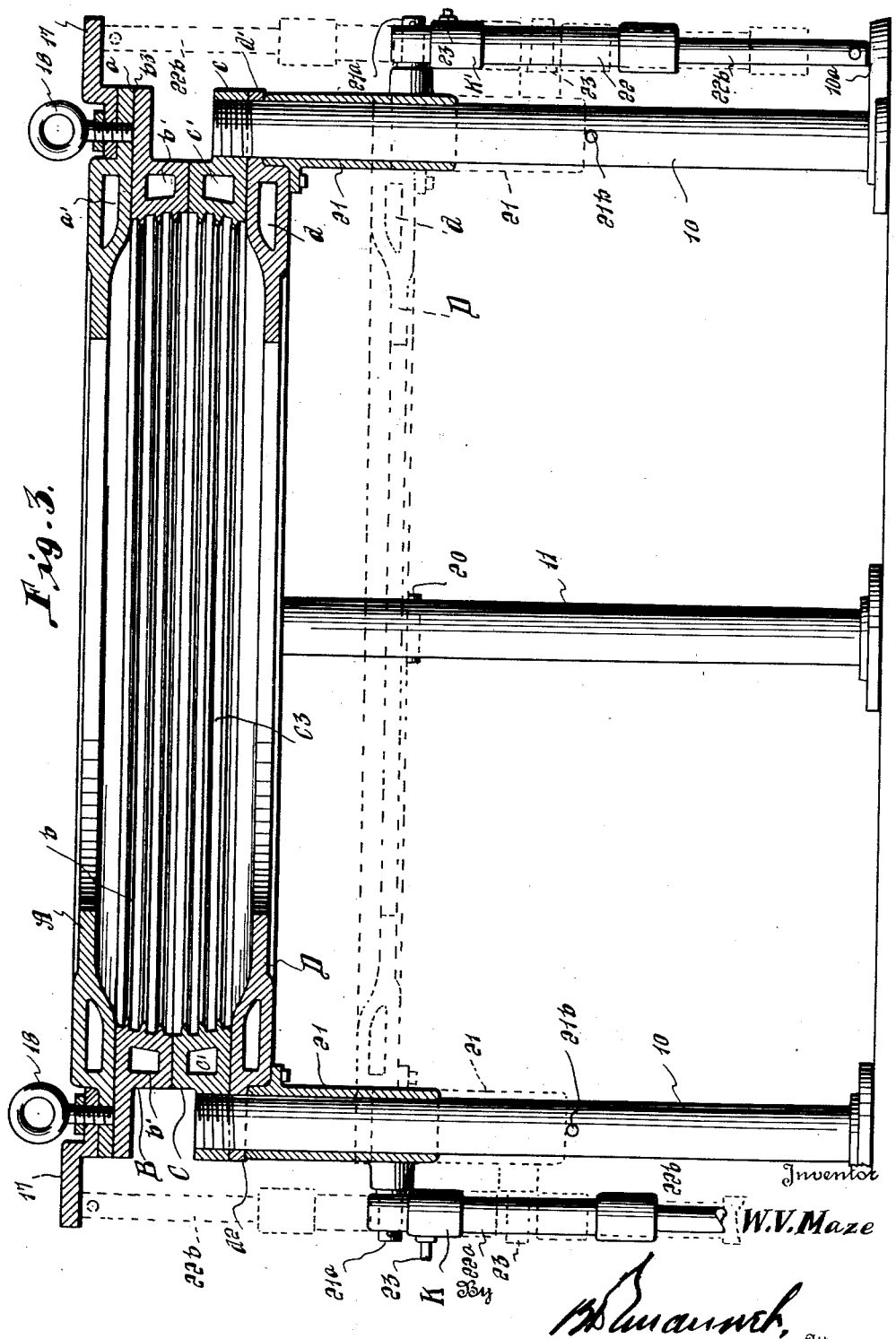

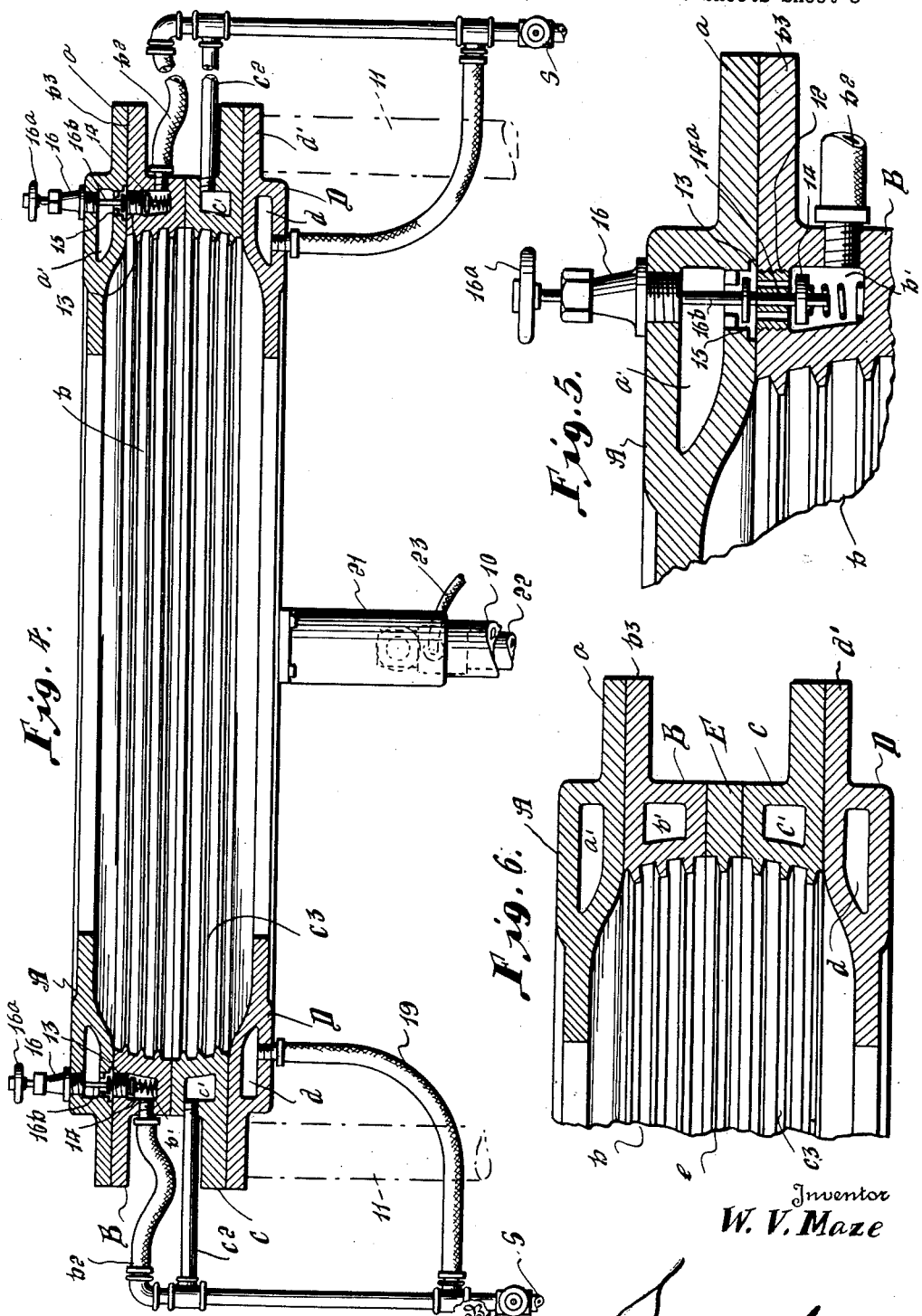

Nov. 17, 1942.　　　　W. V. MAZE　　　　2,302,133
MOLD FOR RETREADING AND/OR RECAPPING TIRES
Filed Feb. 26, 1941　　　5 Sheets-Sheet 4
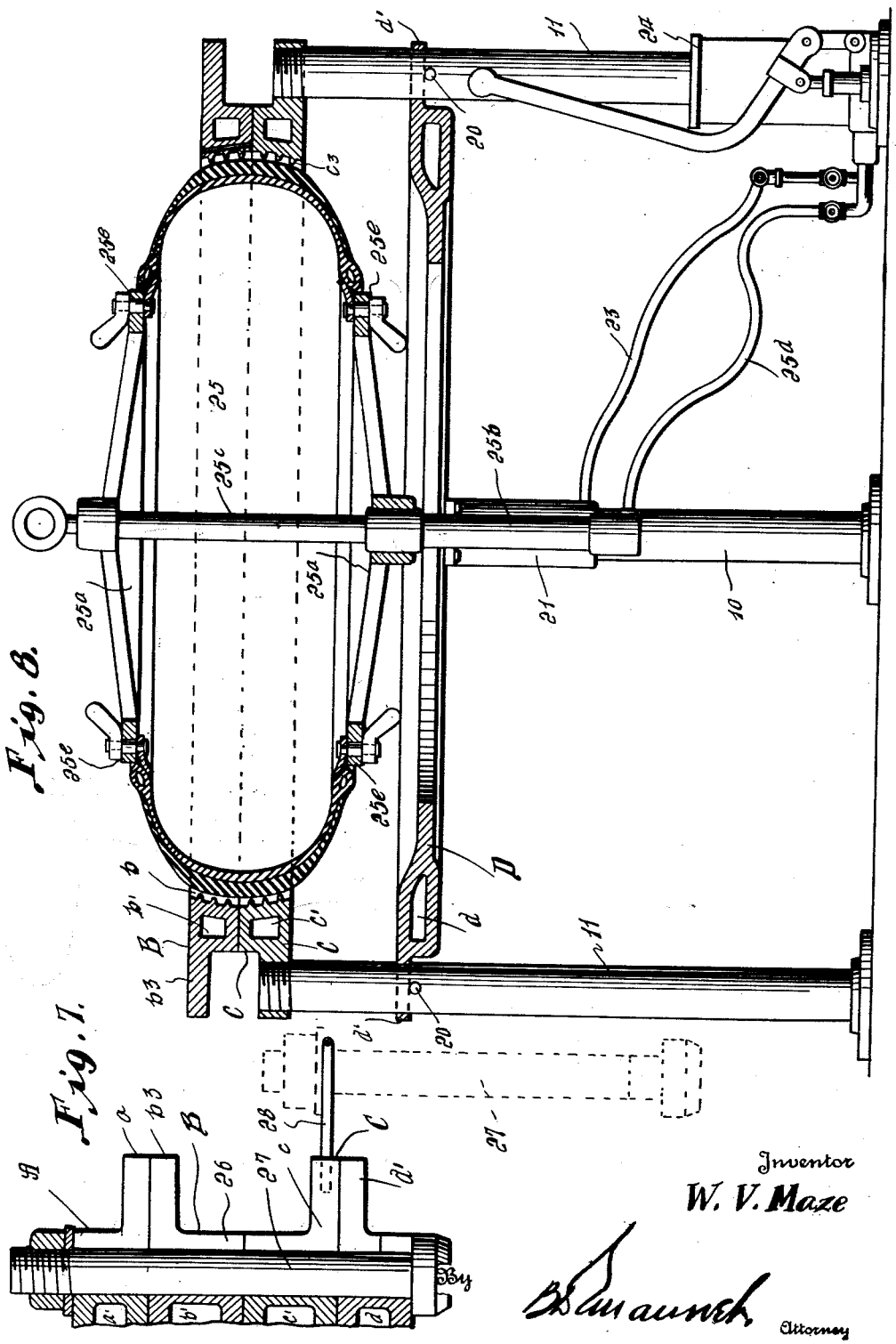
Inventor
W. V. Maze
By
Attorney

Fig. 9.

Patented Nov. 17, 1942

2,302,133

UNITED STATES PATENT OFFICE 2,302,133

MOLD FOR RETREADING AND/OR RECAPPING TIRES

William V. Maze, Anderson, Ind., assignor to C. E. Miller Manufacturing Corporation, Anderson, Ind.

Application February 26, 1941, Serial No. 380,727

6 Claims. (Cl. 18—18)

This invention relates to improvements in molds for retreading and/or re-capping tires, and more particularly tires designed for heavy duty service, exemplified, for instance, by truck tires.

Tires for trucks and the like are usually of large dimensions compared with the usual motor car tires, due to the fact that they not only must carry extreme loads and must operate with air pressures that are high, with the result that the tires must be built to meet these extreme conditions. And, because of these conditions, tires of this type generally are serviceable for comparatively short periods, the service conditions setting up a high wear-rate on the tires. To restore service conditions these tires are generally re-treaded or re-capped—as the case may be—thus prolonging the service life of the tires, a result that is greatly desired since the initial cost of such tires is comparatively high. The tires to be serviced are generally sent to the factory or to service stations able to provide the result; while the factories generally are especially equipped for dealing with tires of such dimensions, it is more or less inconvenient and expensive to ship individual tires for servicing, so that the difficulties tend to set up the need for carrying a large supply of tires involving heavy expense. Because of the dimensions, etc., service stations generally are not equipped for the service, and the few thus equipped reduce the above conditions only for the users in the immediate neighborhood.

While there has been this ability to retread and re-cap tires at such points, the service has its difficulties and the results have not always been successful, due to the fact that while it would be possible to position the tire within the mold apparatus, there has been difficulty in doing this as well as in removing the tire from the mold after the vulcanization has been completed. Because of the large dimensions of the tire, and the shapes, the mold apparatus is necessarily very heavy and the vulcanization requirements are severe, the result being that attempts to provide successful outcome are difficult.

The present invention is designed to greatly eliminate many of these difficulties and provide a molding apparatus capable of providing successful and superior results and at the same time simplify the apparatus to such an extent as to reduce the costs of installation and simplify the operation.

To these and other ends, therefore, the nature of which will be set forth in detail as the invention is hereinafter more fully described, said invention consists in the improved construction and combinations of parts hereinafter described in detail, illustrated in the accompanying drawings, and more particularly pointed out in the appended claims.

In the accompanying drawings, in which similar reference characters indicate similar parts in each of the views:

Figure 1 is a side elevation showing the apparatus in its operating position;

Figure 2 is a top plan view;

Figure 3 is a vertical sectional view taken on line 3—3 of Figure 2, the view indicating—in dotted lines—certain change in position of some of the elements;

Figure 4 is a vertical sectional view taken on line 4—4 of Figure 1, portions of the supporting structure being omitted;

Figure 5 is a detail sectional view taken on line 5—5 of Figure 2;

Figure 6 is a fragmentary sectional view showing the addition of a filler element used with tires of abnormal width;

Figure 7 is a fragmentary section taken on line 7—7 of Figure 2;

Figure 8 is a vertical sectional view with the apparatus in position to receive a tire, the view illustrating a tire being positioned;

Figure 9 is a vertical sectional view showing another and preferred form of spreader mechanism.

Tires for heavy duty service such as trucking and the like are of greatly increased dimensions as compared with the usual motor vehicle tires, the dimensional increase being in diameter, width, tread or cap thickness etc. Because of the heavy load weights for which the truck is designed, it is necessary that the tire be capable of sustaining the loads—necessitating the use of high air pressure in the tires—and also of sustaining the needed air pressures and protect the inner tube formations. As a result the tires are not only of large dimensions but the tread or cap zone, as the case may be, is of considerable thickness. Since truck service is extremely severe on the tires, the wear in the tread zone is at a high rate so that the tire must be re-treaded or re-capped after a comparatively short life.

Re-treading or re-capping of the tire is by a vulcanization action which is effective within the tread zone, with the result that the mold structure that is used must be of sufficiently greater dimensions to place the vulcanizing zone as external of the tire periphery. Hence, the mold is itself of large dimensions and, to enable insertion and removal of the tire, is made sectional, thus adding to the problem the need of a structure in which the desired vulcanizing temperatures can be produced in such manner as to provide for uniformity in heat distribution within the zone being operated upon. These conditions, coupled with the fact that the mold sections must be moved into and out of position for vulcanizing, can indicate the severity of some of the problems which are set up because of the large dimensions of the tire per se.

Since tires of this type have their tread surfaces arcuate laterally, the sectional arrangement of the mold must be such as will enable the ready insertion and removal of the tire. A part of the difficulty in this respect can be met by the use of a spreader mechanism by means of which the side walls of the tire and the clincher zone can be spread apart to an extent such as to tend to draw the periphery inwardly sufficient to permit insertion and removal of the tire from intermediate sections of the mold, but the side mold sections must be movable bodily relative to the intermediate sections to permit such insertion and withdrawal. Hence, the apparatus must be capable of having the side sections readily shiftable during such period, but be capable of providing complete molding action during the vulcanization. Since the sections are annular and are of fairly large weights, the manipulation thereof must be with care to ensure proper positioning, etc., and to enable the action to be provided simply and with rapidity. The present invention is designed to meet these and other conditions which will be made clear as the invention is disclosed.

The mold is normally made up of four sections A, B, C, and D, these being annular and extend in horizontal planes, sections B and C being intermediate sections, while sections A and D are the outer sections and form the top and bottom walls of the assembly. Where the tire is of abnormal width, an additional section E is interposed between sections B and C, as indicated in Fig. 6.

The mold is supported in suitable manner, as by legs, four of these being shown and arranged in two pairs located substantially equidistant, the legs of a pair being diametrically opposite, the legs of the two pairs being indicated as at 10, 10, and 11, 11, respectively. Each of the legs is secured at its upper end—as by a threaded connection—with section C, the latter being provided with an annular flange or with ears c external of an annular zone which is formed hollow to serve as a heating chamber c' for the section, the invention contemplating the use of steam as the heating agent. Since section C thus becomes a stationary section, its chamber c' is connected with the steam supply S by a stationary connection or connections $c^2$. The molding face of section C is shown as provided with ribs $c^3$—the shown apparatus being designed for re-treading the tires; obviously, this face may be a smooth face to thereby render the mold capable of being used for re-capping.

The section B is designed to rest upon section C, and carries a ribbed mold face b and chamber b', the latter, however, being connected with the steam supply by the flexible connection or connections $b^2$, since the section may be raised from its seat on section C when desired. Section B also is provided with one or more ports 12 leading upwardly from the chamber b'—Fig. 5— through the upper wall of the chamber, the port carrying a perforated seat 13 for a spring-supported valve 14, which carries a steam 14a extending through the seat, the stem extending above the seat to permit valve opening from above, as presently explained; the valve will be normally closed when the stem is free from pressure; this arrangement permits section B to feed steam to section A, as presently explained.

Sections B and C carry the major portion of the tread face, and present the arcuate configuration that is usual to this portion of the tire. If, as in Fig. 6, the tire is of abnormal width, section E—carrying the rib e, is interposed between the two sections, section E being of small width and without a heating chamber, the section being heated by conduction from sections B and C.

The upper section A seats upon section B, the latter carrying an annular flange $b^3$ which supports a similar flange a of section A. Section A also carries an annular heating chamber a' which is adapted to communicate with port 12 of section B through an opening or openings 15 in the lower wall of chamber a', the opening 15 and port 12 being in vertical alinement with stem 14a extending into the opening. The upper wall of the chamber a' carries a valve actuator 16 formed with a threading element 16a and a stem 16b adapted to contact the upper end of stem 14a, it being readily understood that when element 16a is rotated to move downwardly, such movement will open valve 14, and when moved in the opposite direction the valve will automatically close through the action of the valve spring. The drawings show the use of two of such valve actuators 16 thus permitting of a more rapid supply of the steam volume to chamber a'. The section A also carries a pair of lugs 17 these lugs being secured to the upper face of flange a by eye-bolts 18, the lugs projecting outwardly beyond the periphery of the flange, and located at diametrically-opposite positions and in substantially vertical alinement with the pair of legs 10; the purpose of these lugs will be presently indicated.

As shown, the walls of section A extend inwardly a considerable distance beyond the mold face of section B, and the lower wall of such extended portion provides a side wall of the mold cavity formation within which the tire to be vulcanized is to be received. The mold face of such extension therefore conforms generally with a side wall of the tire beyond the clincher zone of the tire.

The lower section D generally simulates section A as to the cross-sectional contour having a flange d' designed to contact the flange c when the mold is in active position. However, section D has its individual heating chamber d connected up to the steam supply by flexible connector 19. The mold face of section D is the reverse of that of section A, so that when the mold is in active position, the several contacting sections will produce the mold cavity for the vulcanizing operation. The flange d' of section D is further provided with openings $d^2$—these may be recesses—corresponding in position to the legs 10, 11, the section D being designed to move vertically relative to the legs between its position of contact with section C and an inactive position spaced below section C (Figs. 3 and 8), legs 11 carrying pins 20 active in supporting the section in the lowered position.

Section D also carries a pair of sleeves 21 which surround the legs, the upper ends of the sleeves contacting flange d', and extending downward for a distance sufficient to locate a pivot pin 21a at a proper point to permit the operation presently described; legs 10 carry pins 21b to co-operate with pins 20 in the support of section D, pins 21b being positioned to limit the downward movement of the sleeves.

Each pivot pin 21a is designed to receive one end of a ram structure 22, designed to swivel bodily about pin 21a. The ram structure is made up of a tubular section 22a and a plunger structure 22b projecting through the outer end of section 22a. Section 22a is adapted to be operatively connected—by flexible connection 23 to a suitable source of fluid pressure supply 24, shown as hand-pump structure, the supply is arranged in such manner that the fluid pressure—exemplified by air pressure—may be supplied to or withdrawn from section 22a the connection being at the inner end of the section. The ram structure is present in connection with both legs 10, the two structures being duplicates, with both connected up to the source of pressure supply. Obviously, the fluid pressure may be other than air pressure, and the source of supply may be of any desired formation operated either by hand or by power as desired; hand operation in connection with air pressure offers a simplified structure usable at service plants.

25 indicates a ram or spreader assembly comprising a pair of skeleton frames 25a carried respectively by a casing 25b and plunger 25c, the casing having a flexible connection as at 25d, with the source of pressure supply, the plunger and casing having characteristics of a ram structure operative to operate the frames in presence of active fluid pressure, and permitting the frames to approach each other when such pressure is released. The spreader assembly is designed to spread the tire during positioning and removal of the tire relative to the mold, the frames carrying suitable tire engaging structures 25e adapted to co-operate with the tire clincher zone when the spreader assembly is active. The sections A, B, C and D are of annular form, and the spreader assembly is designed to be placed within the central or axial open area of the mold during service.

Figure 9:
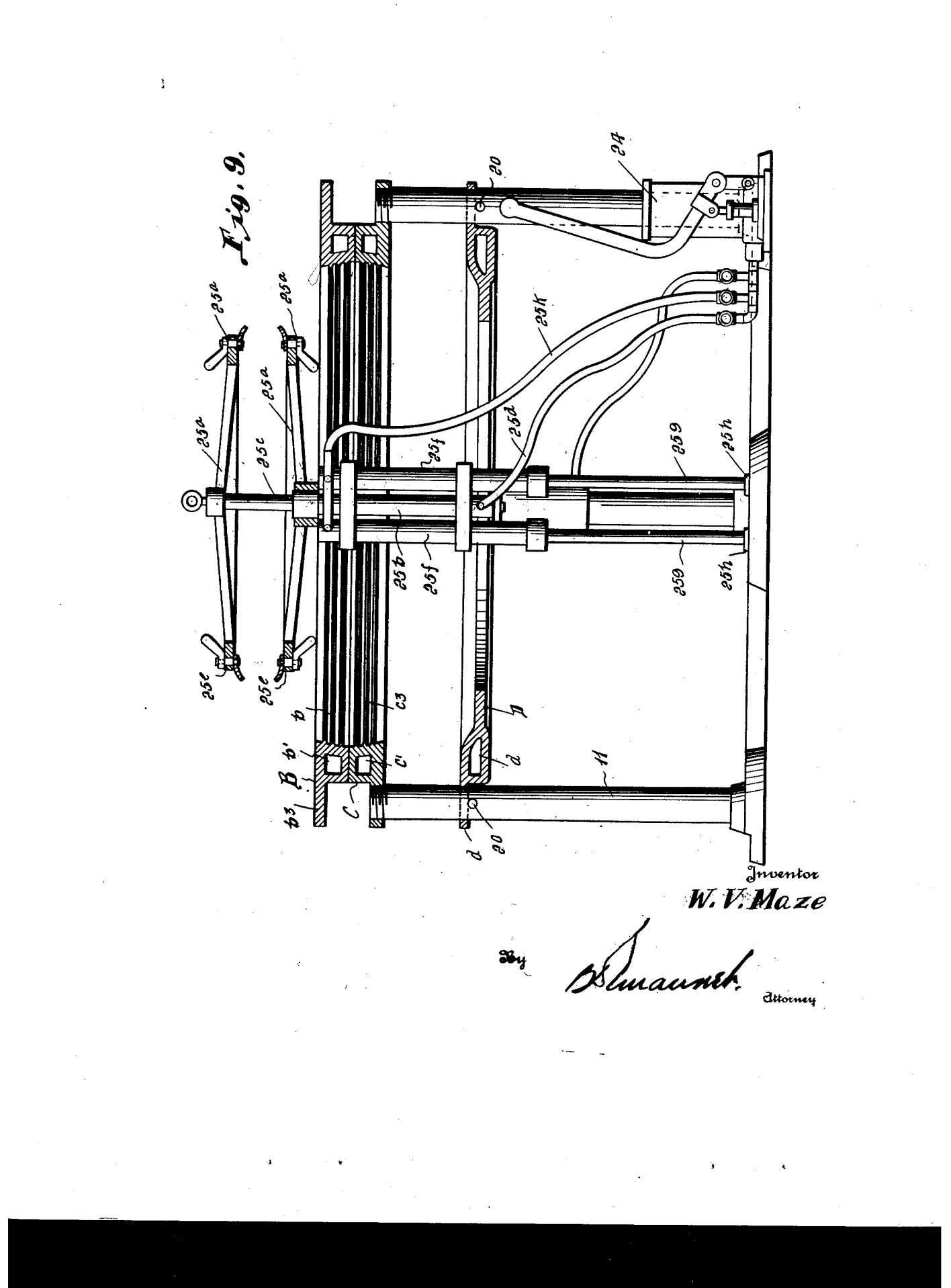

The spreader mechanism may be a removable structure, as in Fig. 8—in which case a suitable temporary support therefore would be located below the axial zone of the molding sections. However, it is preferred to provide a permanent location to the mechanism, as in Fig. 9, in which the casing 25b is itself carried by a pair of casings 25f which, together with a pair of plungers 25g, produce a telescopic support for the mechanism, the lower ends of the plungers contacting suitable supports 25h. The upper ends of casings 25f are operatively connected with the source of pressure supply 24 by flexible connector 25k. This arrangement has the definite advantage of being permanently located and thus assuring accuracy in positioning of the tire; enables the mechanism to be moved into and out of its tire-seating position, in a simple manner; enables positioning of the tire in the spreader with the tire in an upper or lower plane than the mold at will; makes possible the tire manipulation in the upper or lower position and the bodily moving of the manipulated tire to its proper level within the mold sections, to simplify the positioning of the tire within the mold.

By then permitting frames 25a to approach each other the tire will assume proper position within the mold, the tire engaging structure 25e be disengaged from the tire, and then the entire spreading mechanism be lowered to an inactive position below the mold through permitting escape of the pressure. When the tire is to be removed, the mechanism is raised by pressure through connection 25k, the structures 25e connected to the clincher zone of the tire, and the frames 25a separated by the pressure in connection 25d, reducing the diameter of the tire, as presently explained, and permitting removal of the tire by simply lowering the entire spreader mechanism by release of a pressure in connector 25k, after which the frames 25a are again permitted to approach each other by release of pressure in connection 25d, releasing the tire from the structures 25e and leaving the completed tire completely free and in its retreaded condition.

While reference has been made to positioning the tire in the spreading mechanism below the plane of the molds, the length of casings 25f and plungers 25g may be such as to raise the frames 25a a considerable distance above the mold level —as indicated in Fig. 9—so that the tire may be positioned in the spreading mechanism above the mold level instead of below such level, and those activities indicated as below such level be made manifest above the level, the mechanism, however, in its inactive position, being below such position.

Sections A, B, C, and D each are provided with radial recesses 26 extending inwardly from their peripheries, Fig. 2, eight being shown, these being designed to receive clamping bolts 27 designed to clamp the sections in close contacting relationship during the molding operation. For convenience, section C carries a series of loops 28 projecting outwardly and through which the bolts 27 pass; the loops serve to support the bolts when out of clamping position, the arrangement permitting rapid positioning and removal of bolts, since the loops are aligned with the recesses.

When the apparatus is in its idle position, sections B and C are in the positions shown in Figs. 3 and 8, with section D in the dotted line position of Fig. 3, and the full line position of Fig. 8; at this time section A is located away from the apparatus. The sleeves 21 are in their lower positions, thus locating the pivot pin 21a in the lower position, the rams 22 extending downward with the free ends of plungers 22b contacting an extension 10a of legs 10—the lower dotted line position of Fig. 3 indicates the ram position at such time, the plungers 22b being mainly housed within sections 22a. The steam pressure is inactive through valve closure, and the fluid pressure is also inactive.

Assuming that the mold cavity of Fig. 4 is of sufficient dimension to treat the tire to be treated—if the tire is of abnormal dimension sections E (Fig. 6) will be placed in position between sections B and C—and that the tire is to be re-treaded, the initial step is to place the tire in position relative to sections B and C. Since the mold face is curved laterally and includes the ribbed formation, it is apparent that the tire, in normal form, will not readily enter the cavity, especially if the latter has received a supply of stock designed to supply any deficiency which had been produced through service wear conditions. To meet this condition, the spreader assembly is brought into service.

With the frames 25a in the proper positions to permit the clincher zones of the tire to be properly secured to the frames by structures 25e, such securing is had, after which the fluid pressure means is made active on the ram 25, causing the plunger 25c to be advanced in a direction to separate the frames 25a. The latter action opens out the sides of the tire and at the same time tends to draw the tire sides and tread inwardly, since the structures 25e prevent the clincher zones moving radially outwardly. As a result, there is a tendency to reduce the diameter of the tread zone and slightly compress its content. When the tread zone is sufficiently reduced in diameter, the tire is moved into proper position relative to sections B and C, whereupon the fluid pressure is released, thus permitting the frame to return to initial position to restore the normal condition of the sides of the tire and to permit the tread zone to expand into its proper relation to the mold face of sections B and C.

Section A—which is located at a point removed from the assembly during the completion of the previous treading operation, is now placed in position on section B; assuming that section A had been removed by a crane with a sling connected to the eye-bolts 18, the crane is moved to position section A over the section B, after which section A is lowered to position, thus closing the upper side of the cavity on to the positioned tire.

The source of fluid pressure is now made active, through connections 23, on the ram structures 22. Since the free ends of the rams 22b are contacting extensions 10a, it is apparent that the active fluid pressure becomes effective on the sections 22a to raise them, with the result that sleeves 21 are thereby raised together with section D which is supported by such sleeves. This action continues until section D is brought into close contact with section C. Clamping bolts 27 are then placed in position in recesses 26 and drawn tightly, thus drawing the sections into their operative positions with the tire in proper position within the mold cavity. After the usual curing bag has been positioned, the steam supply is made active—actuators 16 being rotated to open valve 14—thus supplying steam to each of the section chambers to produce the heat required for rendering the mold faces active as vulcanizing faces.

As will be understood, the large dimensions and weight of the sections will tend to place a heavy strain upon the threaded connections between the legs 10 and 11 and section C, as well as upon the legs, due to the fact that the presence of bolts 27 clamps sections A, B, and D, to section C. However, this tendency is overcome by the fact that the two ram structures 22, then in the full line position of Fig. 1, are serving as additional and auxiliary supporting legs active directly on section D, so that during the period when the four sections are assembled for providing the vulcanizing operation, the assembly is actually being supported by the equivalent of six legs, with two of them,—the ram structure—not depending upon the threaded connections referred to. Hence, the assembly is adequately supported without the need of a central support, and the sections can therefore be made annular without likelihood of collapse, leaving a central space readily adapted for service in connection with the spreader assembly.

After the vulcanization action has been completed, the steam supply rendered inactive, and the period of removal of the tire arrives, the curing bag is removed and the mold is disassembled by the following activities: With the ram structures 22 in the supporting position of Fig. 1, bolts 27 are released and permitted to seat in the loops 28; if necessary, the ram structures can be given a slightly increased pressure to permit greater ease in loosening the clamping nuts of the bolts—the nuts need not be removed from the bolts, but loosened sufficient to permit the bolts to readily leave the recesses 26. The fluid pressure is then gradually lowered to permit the weight of section D to become active as a releasing agency for the section and to permit the ram structures to gradually collapse, thus permitting sleeves 21 to lower until they come to rest on pins 21b and the section to rest on pins 20. This opens the lower side of the mold cavity.

The ram structures 22 are now swung on their pivots 21a to extend upwardly, after which the fluid pressure is admitted through connections 23 until the plunger 22b has been raised into contact with lugs 17, thus placing the rams active with section A. By continuing the fluid pressure activity, section A will then be raised out of contact with section B—actuators 16 being operated to close valve 14 at the proper time—after which the crane and its sling are operatively connected with eye-bolts 18, and section A moved to one side, leaving sections B and C with the re-treaded tire in position. The ram structures 22 are then returned to the lower position ready for the next re-treading operation.

The spreader assembly is now moved to the proper position and the clincher zones grasped as before, after which the operation of ram 25 will again spread the sides of the tire with consequent reduction in diameter, as before, whereupon the tire can be removed from sections B and C.

The cycle of action referred to is not changed when the additional section E is being used, due to the presence of a tire of abnormal width, since the cycle relates to the positioning and removal of sections A and D.

Obviously, the source of fluid pressure supply may be other than a hand pump formation, the latter being a convenient structure which can be utilized at smaller service stations. The actual source of steam supply is not shown, since that can obviously be of any suitable type and connected up to the connections indicated.

As will be apparent, the invention provides an adequate mechanism for meeting the onerous conditions which surround the re-treading or re-capping of tires of the dimensions referred to. Because of the dimensional conditions, the parts are more or less massive in character, since they must be capable of withstanding the temperatures required in vulcanization action without warping, etc., and this fact sets up the weight characteristic as of definite problem conditions. To enable the combined weight to be supported, while providing for a more or less skeletonized supporting structure to enable the manipulation of the tire during positioning and removal, is one of the advantageous results flowing from the invention. By utilizing ram structures 22 for manipulating section D in both raising and lowering activities, and section A to raise it from its active position, a simple but convenient structure is provided in such manner that the action can be taken with a minimum amount of man-power requirements; to this must be added the fact that the ram structures also serve as additional supporting structures during periods when such support is particularly needed, thus adding to such advantages.

As before indicated, the spreader mechanism may be permanently positioned relative to the mold structure—the preferred arrangement shown in Fig. 9—or may be removable, as in Fig. 8, the distinction being that of providing a permanently positioned support or the use of a temporary support. The permanent support is preferred, due to the fact that it may be made telescopic, as shown, and be connected with the fluid pressure supply system of the apparatus, thus reducing the necessity for manual movements, and avoiding the possibility of a maladjustment of the position of the tire relative to the mold cavity.

While I have herein disclosed one or more ways of meeting the problems involved in the re-treading or re-capping of tires, and preferred forms of apparatus for meeting the conditions, it will be readily understood that changes and modifications thereof may be found desirable or essential in meeting the various exigencies of service or the desires of users, and I therefore reserve the right to make any and all such changes or modifications as may be found desirable or essential, insofar as the same may fall within the spirit and scope of the invention as expressed in the accompanying claims, when broadly construed.

I claim:

1. In molding apparatus for re-treading or re-capping tires designed for heavy duty service, wherein the re-treading or re-capping is provided by vulcanization activity, a sectional mold assembly including outer sections and at least a pair of intermediate sections, said assembly having each mold section of permanently annular form and adapted to be assembled in superposed contacting relation with the two outer sections adapted to cooperate with the sides of the tire during the vulcanizing activity and with the intermediate sections adapted to provide the mold face for the arcuate portion of the tire tread zone, means operative at will for heating the assembled sections, permanent supporting means for the assembled sections, and means including a fluid-pressure ram structure supported by the supporting means for controlling movements of the lower mold section to and from its assembly position, said ram structure being additionally operative as an auxiliary support for the assembled sections during vulcanizing activity, the supporting means for the assembly being in the form of two pairs of legs substantially equi-spaced with the legs of a pair substantially diametrically opposite, the legs of one of said pairs each forming a support for a sleeve individual to and movable longitudinally of the leg, said sleeves being secured to and operative in the control of the movement of the lower outer section, and each having an operative connection with a ram structure individual to the sleeve, whereby ram structure movements will be operative in the control of such lower section movements, said legs carrying stop means for limiting the downward movement of the lower outer section.

2. In molding apparatus for re-treading or re-capping tires designed for heavy duty service, wherein the re-treading or re-capping is provided by vulcanization activity, a sectional mold assembly including outer sections and at least a pair of intermediate sections, said assembly having each mold section of permanently annular form and adapted to be assembled in superposed contacting relation with the two outer sections adapted to cooperate with the sides of the tire during the vulcanizing activity and with the intermediate sections adapted to provide the mold face for the arcuate portion of the tire tread zone, means operative at will for heating the assembled sections, permanent supporting means for the assembled sections, and means including a fluid-pressure ram structure supported by the supporting means for controlling movements of the lower mold section to and from its assembly position, said ram structure being additionally operative as an auxiliary support for the assembled sections during vulcanizing activity, the supporting means for the assembly being in the form of two pairs of legs substantially equi-spaced with the legs of a pair substantially diametrically opposite, the legs of one of said pairs each forming a support for a sleeve individual to and movable longitudinally of the leg, said sleeves being secured to and operative in the control of the movement of the lower outer section, each sleeve carrying a lateral pivot pin, said pin being adapted to receive one end of a ram structure individual to the sleeve, whereby the ram structure is operative in the control of the sleeve and lower section movements when the ram structure is in depending relation to its pivot.

3. In molding apparatus for re-treading or re-capping tires designed for heavy duty service, wherein the re-treading or re-capping is provided by vulcanization activity, a sectional mold assembly including outer sections and at least a pair of intermediate sections, said assembly having each mold section of permanently annular form and adapted to be assembled in superposed contacting relation with the two outer sections adapted to cooperate with the sides of the tire during the vulcanizing activity and with the intermediate sections adapted to provide the mold face for the arcuate portion of the tire tread zone, means operative at will for heating the assembled sections, permanent supporting means for the assembled sections, and means including a fluid-pressure ram structure supported by the supporting means for controlling movements of the lower mold section to and from its assembly position, said ram structure being additionally operative as an auxiliary support for the assembled sections during vulcanizing activity, the supporting means for the assembly being in the form of two pairs of legs substantially equi-spaced with the legs of a pair substantially diametrically opposite, the legs of one of said pairs each forming a support for a sleeve individual to and movable longitudinally of the leg, said sleeves being secured to and operative in the control of the movements of the lower outer section, each sleeve carrying a lateral pivot pin, said pin being adapted to receive one end of a ram structure individual to the sleeve, whereby the ram structure is operative in the control of the sleeve and lower section movements when the ram structure is in depending relation to its pivot, the outer upper section having a pair of peripheral lugs positioned in the path of swinging movement of the ram structure about its pivot, whereby the ram structures are operative to release the upper outer section from its assembly position when the ram structures are shifted into contact with such lugs.

4. In molding apparatus for re-treading or re-capping tires designed for heavy duty service, wherein the re-treading or re-capping is provided by vulcanization activity, a sectional mold assembly including outer sections and at least a pair of intermediate sections, said assembly having each mold section of permanently annular form and adapted to be assembled in superposed contacting relation with the two outer sections adapted to cooperate with the sides of the tire during the vulcanizing activity and with the intermediate sections adapted to provide the mold face for the arcuate portion of the tire tread zone, means operative at will for heating the assembled sections, permanent supporting means for the assembled sections, and means including a fluid-pressure ram structure supported by the supporting means for controlling movements of the lower mold section to and from its assembly position, said ram structure being additionally operative as an auxiliary support for the assembled sections during vulcanizing activity, the supporting means for the assembly being in the form of two pairs of legs substantially equi-spaced with the legs of a pair substantially diametrically opposite, the legs of one of said pairs each forming a support for a sleeve individual to and movable longitudinally of the leg, said sleeves being secured to and operative in the control of the movement of the lower outer section, each sleeve carrying a lateral pivot pin, said pin being adapted to receive one end of a ram structure individual to the sleeve, whereby the ram structure is operative in the control of the sleeve and lower section movements when the ram structure is in depending relation to its pivot, the outer upper section having a pair of peripheral lugs positioned in the path of swinging movement of the ram structure about its pivot, whereby the ram structures are operative to release the upper outer section from its assembly position when the ram structures are shifted into contact with such lugs, said upper outer section also carrying a pair of diametrically opposite eye-bolts to thereby permit such section to be moved to and from position in the assembly by means as a crane and its sling, whereby the upper outer assembly is movable bodily to a position remote with respect to the assembly position.

5. In molding apparatus for re-treading or re-capping tires designed for heavy duty service, wherein the re-treading or re-capping is provided by vulcanization activity, a sectional mold assembly including outer sections and at least a pair of intermediate sections, said assembly having each mold section of permanently annular form and adapted to be assembled in superposed contacting relation with the two outer sections adapted to cooperate with the sides of the tire during the vulcanizing activity and with the intermediate sections adapted to provide the mold face for the arcuate portion of the tire tread zone, means operative at will for heating the assembled sections, permanent supporting means for the assembled sections, and means including a fluid-pressure ram structure supported by the supporting means for controlling movements of the lower mold section to and from its assembly position, said ram structure being additionally operative as an auxiliary support for the assembled sections during vulcanizing activity, the supporting means for the assembly being in the form of two pairs of legs substantially equi-spaced with the legs of a pair substantially diametrically opposite, each leg having a threaded connection with the lower of the intermediate sections of the assembly, one of said pairs of legs each carrying a sleeve movable longitudinally of its leg and being secured to and serving as a supporting element for the lower outer section, each sleeve having an operative connection with a ram structure individual to itself, the pair of ram structures being operative in the control of the movements of the lower outer section through sleeve movements, said ram structures being operative as auxiliary supports when extending vertically below the lower ends of the sleeve.

6. In molding apparatus for re-treading or re-capping tires designed for heavy duty service, wherein the re-treading or re-capping is provided by vulcanization activity, a sectional mold assembly including outer sections and at least a pair of intermediate sections, said assembly having each mold section of permanently annular form and adapted to be assembled in superposed contacting relation with the two outer sections adapted to cooperate with the sides of the tire during the vulcanizing activity and with the intermediate sections adapted to provide the mold face for the arcuate portion of the tire tread zone, means operative at will for heating the assembled sections, permanent supporting means for the assembled sections, and means including a fluid-pressure ram structure supported by the supporting means for controlling movements of the lower mold section to and from its assembly position, said ram structure being additionally operative as an auxiliary support for the assembled sections during vulcanizing activity, in combination with a spreader assembly positionable within the axial zone of the annular sections, said spreader assembly including a fluid-pressure ram structure, elements carried thereby adapted to be detachably connected to the clincher zone of a tire, said elements being subject to the movements of the spreader assembly ram structure to thereby provide manipulation of the tire by ram movements to permit positioning and removal of the tire to and from the mold zone provided by the intermediate sections, and a telescopic support for said spreader assembly operatively and controllably connected with the fluid pressure supply and adapted to move the fluid-pressure ram structure of the spreader assembly into and out of position to locate the tire within and remove it from the mold cavity.

WILLIAM V. MAZE.